E. T. ROSS AND M. O. TRUDEAU.
DRIVING AXLE CONSTRUCTION FOR VEHICLES.
APPLICATION FILED JULY 5, 1917.
1,338,042.
Patented Apr. 27, 1920.
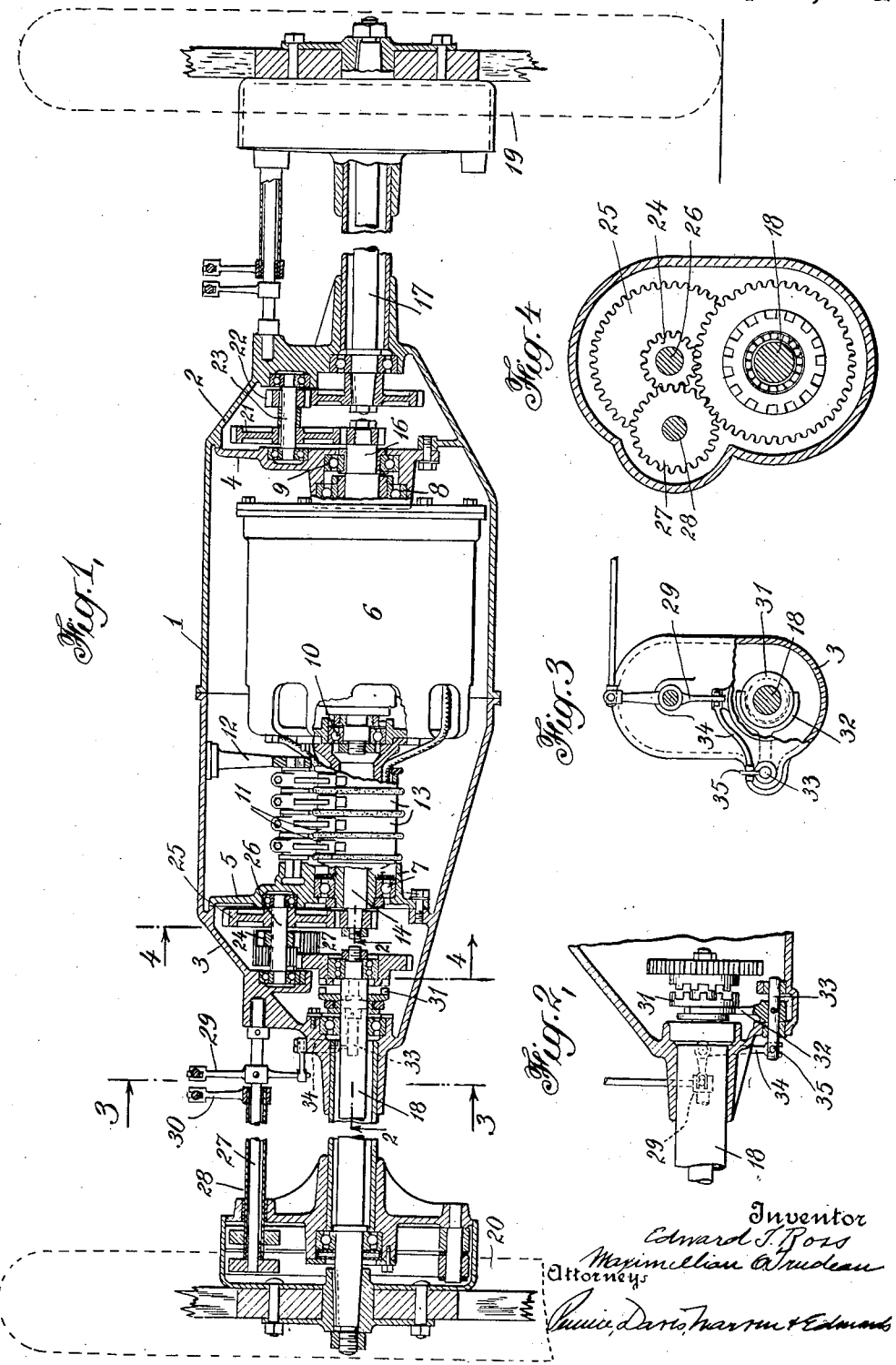

UNITED STATES PATENT OFFICE.

EDWARD T. ROSS, OF NEWARK, NEW JERSEY, AND MAXIMILLIAN O. TRUDEAU, OF WOODMONT, CONNECTICUT.

DRIVING-AXLE CONSTRUCTION FOR VEHICLES.

1,338,042.      Specification of Letters Patent.      Patented Apr. 27, 1920.

Application filed July 5, 1917. Serial No. 178,581.

*To all whom it may concern:*

Be it known that we, EDWARD T. ROSS, a citizen of the United States, residing in Newark, county of Essex, and State of New Jersey, and MAXIMILLIAN O. TRUDEAU, a citizen of the United States, residing in Woodmont, county of New Haven, and State of Connecticut, have invented certain new and useful Improvements in Driving-Axle Construction for Vehicles; and we do hereby declare the following to be a full, clear, and exact description of the invention, such as will enable others skilled in the art to which it appertains to make and use the same.

The object of our invention is to provide a simple, rugged, conveniently accessible and durable drive particularly designed for electric vehicles; although the drive construction which we have developed is also applicable to vehicles driven by types of re-action motors other than the electric motor, such as turbines and the like. The invention, of which the preferred form is shown in the accompanying drawings as applied to an electric drive, involves a driving axle construction embodying a central housing inclosing the motor and flanked at each end by a gear casing, the gear casings being separated from the motor housing by partition walls. Both elements of the motor are rotatably mounted on suitable bearings and the shaft of each of the rotatable elements extends through one of the partition walls into the adjacent gear casing where it carries a pinion forming the first element of a speed reducing gearing within the gear casing. The last element of each speed reducing gearing is connected to an axle which drives a traction wheel. Provision is made for causing the application of the brakes to disconnect one or both of the rotating elements of the motor from the wheel or wheels driven thereby, so that the momentum of the rotating mass of the motor element will not strain the driving mechanism when the brakes are applied.

In the drawings, Figure 1 is a sectional elevation of the driving axle construction showing an electric motor applied thereto. Fig. 2 is a detail plan view of the mechanism for disconnecting one rotating motor element from the traction wheel which it drives. Fig. 3 is an elevation on the line 3—3 of Fig. 1, looking in the direction of the arrow and showing the connection between the brake applying mechanism and the disconnecting mechanism, and Fig. 4 is a section on the line 4—4 of Fig. 3, showing an arrangement of speed reducing gearing including an idler which is interposed in one of the speed reducing gear trains for the purpose of causing the oppositely rotating motor elements to drive the two traction wheels in the same direction.

The axle construction comprises a central motor casing 1 flanked at each end by a gear casing 2, 3, the gear casings being separated from the motor casing by the partitions 4, 5. In the preferred construction shown, the motor casing and the two gear casings are within a single casting and the partitions 4 and 5 consist of plates bolted to flanges within the casting as shown, the plates having no openings excepting those through which the shafts of the two motor elements extend, so that the grease which will be contained within the gear casings will be completely excluded from the motor casing. Each of the casings will have in practice its individual cover plate so that each is accessible independently of the others. The motor here shown is an electric motor of standard construction and in itself forms no part of the present invention. It has a field structure 6 rotatably mounted on the ball-bearings 7 and 8 and incloses an armature mounted on ball-bearings 9 and 10. The bearings 7, 8 and 9 are supported in tubular projections from the plates 4 and 5, and the bearing 10 for the left-hand end of the armature is supported on the field structure. The current is supplied to the rotating field through brushes 11 mounted on a fixed shaft supported at one end in the plate 5 and at the other end in a bracket 12, and bearing on slip-rings 13 surrounding the shaft 14 of the field structure. It will be seen that the shaft 14 of the field projects through the partition 5 into the gear casing 3 and the shaft 16 of the armature projects through the partition 4 into the gear casing 2, and each of these shafts carries a pinion which forms the first element of a speed reducing gear train adapted to transmit the movement of the motor element to a pinion on the end of a stub shaft 17, 18, each of which stub shafts carries a traction wheel 19, 20. The speed reducing gearing in the casing 2 includes, in addition to the pinions fastened to the shafts 16 and 17, the two pinions 21, 22 mounted on a shaft 23, supported on ball-bearings within the casing 2. The gearing in casing 3 includes, in addition to the pinions secured to the shafts 14 and 18, the two pinions 24 and 25 mounted on the shaft 26 and an idler pinion 27 mounted on an additional shaft 28 (see Fig. 4), so that the oppositely rotating motor elements will drive the two traction wheels in the same direction.

Associated with each traction wheel is the ordinary brake mechanism including an emergency brake and a service brake shown in section at the left of Fig. 1, the service brake being operated by a rocking shaft 27 and the emergency brake by a rocking sleeve 28 rocked by the levers 29 and 30 which will be connected in the usual way to a service brake pedal or lever and an emergency brake pedal or lever at the driver's seat.

The field structure of the electric motor shown has considerable mass and when rotating will have a corresponding momentum which would strain the driving connection between it and the associated traction wheel if the connection were not interrupted upon the application of the brakes. To effect such an interruption, we provide a detachable connection between this motor element and the traction wheel driven thereby. In the particular case here illustrated, the mass of the other motor element, that is, the rotating armature, is not sufficiently great to require such disconnecting means, but in any case where both motor elements are of sufficient mass to make such disconnecting mechanism necessary or advisable, the mechanism here shown for one of the motor elements may be duplicated for the other. As shown at the right of Fig. 1 and in Figs. 2 and 3, the disconnecting mechanism consists of a shiftable clutch 31 splined to the end of the shaft 18 and operated by a yoke arm 32 mounted on rod 33 actuated by bell-crank lever 34 pivoted on the casing and connected by rod 35 with the lever 29, so that when the service brakes are applied the movement of the lever 29 will result in the turning of the bell-crank lever 34 and the shifting of the clutch 31 out of engagement with the loosely mounted pinion on the end of the shaft 18 and constituting the last element of the speed reducing gearing. The clutch here shown is a tooth clutch, but a cone or disk clutch may be substituted if desired.

With this arrangement the entire driving mechanism of the vehicle is concentrated upon the driving axle, the driving motor is completely incased but is readily accessible, the speed reducing gearings are in their individual casings which may contain grease, without danger of the grease working into the motor casing, and the entire construction is simple, rugged and inexpensive.

What we claim is:

1. A driving axle construction for re-action-motor driven vehicles comprising a reaction motor having two oppositely rotating power elements and a speed reducing gearing connecting each of said elements to a driving axle which drives a traction wheel, and means under the control of the driver of the vehicle for disconnecting from a driving axle its associated power element when the vehicle is to be brought to rest.

2. A driving axle construction for re-action-motor driven vehicles comprising a reaction motor having two oppositely rotating power elements and a speed reducing gearing connecting each of said elements to a driving axle which drives a traction wheel, and means associated with brake-applying mechanism of the vehicle for automatically disconnecting a driving shaft from its associated power element when the vehicle brakes are applied.

3. A driving axle construction for re-action-motor driven vehicles comprising a central motor casing, a gear casing at each end of the motor casing and separated therefrom by a dividing partition, a re-action motor in the casing having two oppositely rotating power elements each of which has a shaft extending through a partition into one of the gear casings, a pair of driving axles the inner end of each of which projects into one of the gear casings, the motor elements, shafts and the driving axles being in alinement with one another.

In testimony whereof we affix our signatures.

EDWARD T. ROSS.
MAXIMILLIAN O. TRUDEAU.